(12) United States Patent
Deuter

(10) Patent No.: US 7,063,446 B2
(45) Date of Patent: Jun. 20, 2006

(54) LAMP MOUNT

(75) Inventor: Markus Deuter, Ansbach (DE)

(73) Assignee: Oechsler AG, Ansbach (DE)

( * ) Notice: Subject to any disclaimer, the term of this patent is extended or adjusted under 35 U.S.C. 154(b) by 0 days.

(21) Appl. No.: 10/921,796

(22) Filed: Aug. 20, 2004

(65) Prior Publication Data

US 2005/0047171 A1    Mar. 3, 2005

(30) Foreign Application Priority Data

Aug. 23, 2003   (DE)   ............ 203 13 185 U

(51) Int. Cl.
*F21S 8/08*  (2006.01)
*F21V 19/02* (2006.01)

(52) U.S. Cl. ............ 362/418; 362/507; 362/538; 362/541; 362/542; 362/548; 362/549; 362/651; 362/519

(58) Field of Classification Search .......... 362/418, 362/506, 507, 538, 540, 541, 542, 548, 549, 362/651, 640, 427, 428, 431, 475, 479, 519
See application file for complete search history.

(56) References Cited

U.S. PATENT DOCUMENTS 971,265  A  *  9/1910   Gover  .................. 362/538

FOREIGN PATENT DOCUMENTS

| DE | 199 33 768 | 1/2001 |
|---|---|---|
| DE | 100 27 979 | 12/2001 |
| EP | 1 284 388 | 2/2003 |
| FR | 2 332 490 | 7/1997 |

* cited by examiner

*Primary Examiner*—Sandra O'Shea
*Assistant Examiner*—Sharon Payne
(74) *Attorney, Agent, or Firm*—Buchanan Ingersoll PC

(57) ABSTRACT

A light assembly includes a housing which defines a longitudinal axis. A hollow holding ring and a reflector are fixed within the housing and spaced apart along the axis. A hollow positioning sleeve is disposed at a rear end of the reflector and is arranged on the axis at a distance forwardly from the holding ring. A tube extends along the axis and includes front and rear portions. The front portion is mounted in the positioning sleeve and includes a bulb receptacle for positioning a bulb within the reflector. The rear portion includes an electrical connection portion disposed in the holding ring. The tube is inserted axially through the holding ring and the positioning sleeve and into the reflector and then is rotated about the axis in order to cause the tube to become locked against axial movement relative to the reflector.

23 Claims, 3 Drawing Sheets

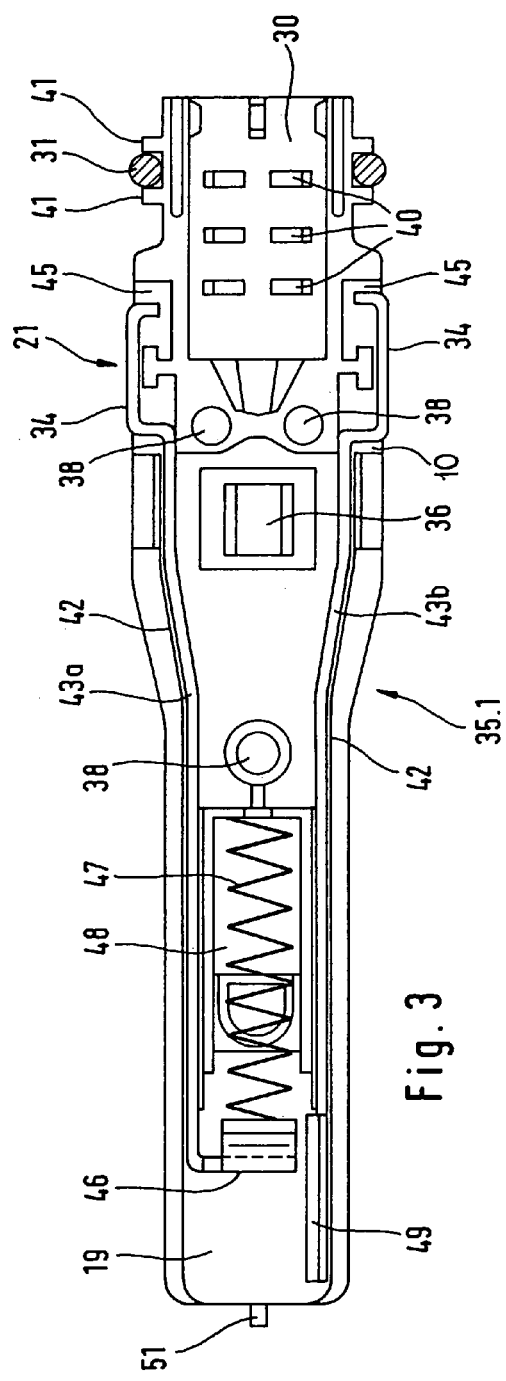
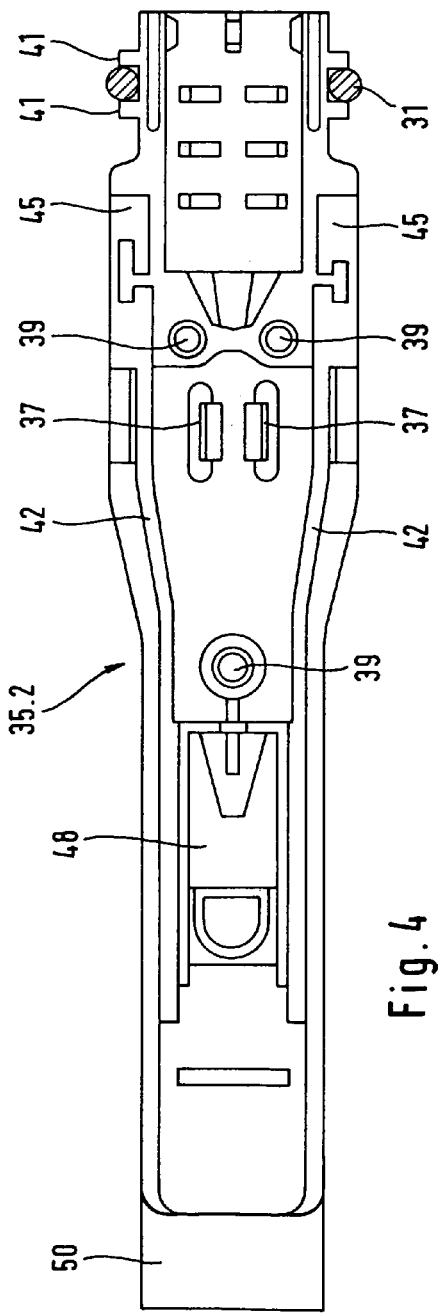
Fig. 3
Fig. 4

LAMP MOUNT

BACKGROUND OF THE INVENTION

This application claims priority under 35 U.S.C. §§ 119 and/or 365 to Patent Application Serial No. DE 20313185.1, filed in Germany on Aug. 23, 2003, the entire content of which is hereby incorporated by reference.

The invention relates to a light bulb receptacle insertable through a holding ring which is fixed to a housing of a light assembly. The receptacle is insertable into a reflector and is removable from the housing.

Such a receptacle for a light bulb base is known from EP 1 284 388 with a design as it can be found particularly for light assemblies or headlights of motor vehicles. It has an axial length corresponding to the length of the base of the light bulb, which is inserted into the front of a bayonet-type element. The receptacle is pulled out to the rear together with the light bulb from the shaped holding ring in the reflector, which means, in opposite direction from the direction of the light beam so that the headlight lens does not have to be removed during replacement of the light bulb. The receptacle is equipped at its rear extension with a handling piece for such manual handling, which makes holding and turning of the receptacle easier using one's fingertips.

However, such a handling piece is no longer adequate if the holding ring receiving the receptacle can be reached only through a narrow, deep cavity. Such circumstances can be found if the design of the light does not require the light-producing aspects as a first consideration, but to contribute to the design of the equipment, such as a vehicle body, which is to be furnished with lights fitting a proposed design. Above all, an angled and small-constructed blinking signal light used as driving direction signals on an edge of vehicle body is currently nearly impossible to access to manually replace light bulbs. In addition, the defined reflection geometry requires an accurate positioning of the light bulb filament in front of the reflector relative to the focus point of the reflector and the secure upkeep of contact for electrical power supply to the receptacle and the light bulb inserted therein, which is to be guaranteed even under extremely high heat development in the vicinity of the light bulb receptacle through a halogen bulb.

The invention is therefore based on the technical problem to design a receptacle of this generic type in such a manner that a light bulb can be easily removed by hand, even at positions that are extremely difficult to access, and which can be subsequently operated without being negative influenced by the development of heat.

SUMMARY OF THE INVENTION

This object is achieved by a light assembly which comprises a housing defining a longitudinal axis, and has fixed therein a hollow holding ring and a reflector. The holding ring and the reflector are spaced apart along the axis, wherein the reflector is spaced axially forwardly of the holding ring. A hollow positioning sleeve is disposed at a rear end of the reflector and arranged coaxially on the axis at a distance forwardly from the holding ring. A tube extends along the axis and includes front and rear end portions. The front end portion is mounted in the positioning sleeve and includes a bulb receptacle adapted to position a bulb within the reflector. The rear end portion includes an electrical connection portion disposed in the holding ring.

The invention also pertains to a tube adapted to be inserted into a housing of a light assembly. The tube defines a longitudinal axis and comprises a pair of half-shells defining a longitudinal dividing plane. A lamp receptacle is disposed at a front axial end of the tube, and an electrical connection portion is disposed adjacent a rear axial end of the tube.

The plug-in receptacle for the bayonet-type or quarter-turn base of a light bulb can be designed as a spacing tube in the front region having dimensions corresponding to the diameter of the receptacle whereby axis-parallel metallic strips run lengthwise on the inner surface of said tube as electric conductors leading from the receptacle, which becomes increasing hot, to a connection area disposed axially far apart from said receptacle. The tube together with the receptacle and the connection area is expediently designed by having at least two joinable and sealable shells, preferably two half-shells, which are equipped in the vicinity of their joint with two groove-like, local holding elements lying diametrically opposed to one another to receive longitudinally movable electrical conductors extending between the contacts in the receptacle and the contacts on the outer connection area disposed axially far apart thereof.

According to the development of the invention, there is expeditiously provided for dependable securing of the light bulb in coded bayonet catch of the plug-in receptacle a rigid ring encompassing one of the partial shells of the tube in the region of the light bulb receptacle whereby said ring is disposed at the forward side and coaxial to said receptacle, and whereby there are furnished along the inner wall of said receptacle the axis-parallel grooves of the coding for the light bulb with its radially projecting lugs of the bayonet-type catch being pushed in from the front.

At the rear end opposite the light bulb receptacle, the multi-shell tube connecting the receptacle to the connection area is provided with a pyramid-shaped clamping element consisting of ribs projecting radially toward the inside and extending only across some sections of said tube to be able to insert axially a tool to fix said receptacle non-rotatably and with an axially positive fit. This tool, which serves as an extension of the tube for manual manipulation to replace the light bulb, may be a screwdriver, a polygonal socket wrench or a likewise easily available tool. It is inserted from the rear into the spacing tube to be able to manipulate better or at all the installation of the receptacle equipped with a light bulb up front into a positioning sleeve fixed in the reflector while making contact at the same time with the rear connection area disposed axially opposed in the holding ring on the light housing.

BRIEF DESCRIPTION OF THE DRAWINGS

One is referred for the inventive solution to the following description of the drawings of a preferred embodiment example in addition to further claims relative to more details and advantages as well as to additional developments of the invention. The following drawings are simplified to functional essentials and are not always true to scale.

FIG. 3 shows one half-shell of the tube according to FIG. 1 or FIG. 2 equipped with strip conductors.

FIG. 4 shows the associated second half-shell of the tube.

DESCRIPTION OF A PREFERRED EMBODIMENT OF THE INVENTION

Figure 1:
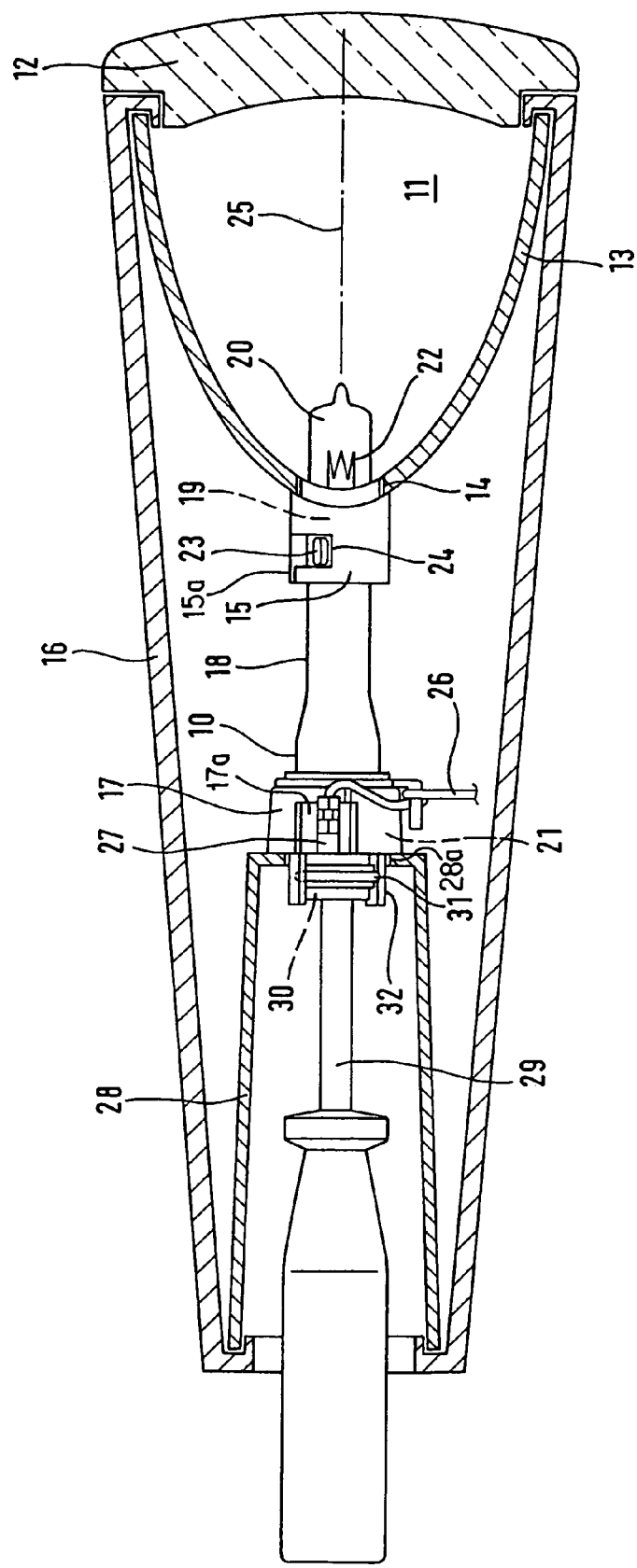
FIG. 1 shows in a longitudinal sectional illustration, the light housing including the reflector, installation and removal of a receptacle tube equipped with a light bulb by using a screwdriver as a tool inserted from the rear.

A light assembly 11, which can be a rear light, brake light or especially a signal light in a body of a motor vehicle, is provided with a diffusing lens 12 and an unusually narrow reflector 13 therebehind having an unusually small cone angle. In the rear end of the reflector 13, there is an opening 14 into which a front end 15*b* of an essentially hollow cylindrical positioning sleeve 15 is inserted, which sleeve is made of highly heat-resistant synthetic material. The sleeve 15 adjoins to the rear end of the vertex of the reflector 13, which means opposite to the radiation direction of the light 11. The center axis 25 of the reflector constitutes a longitudinal system axis.

Figure 2:
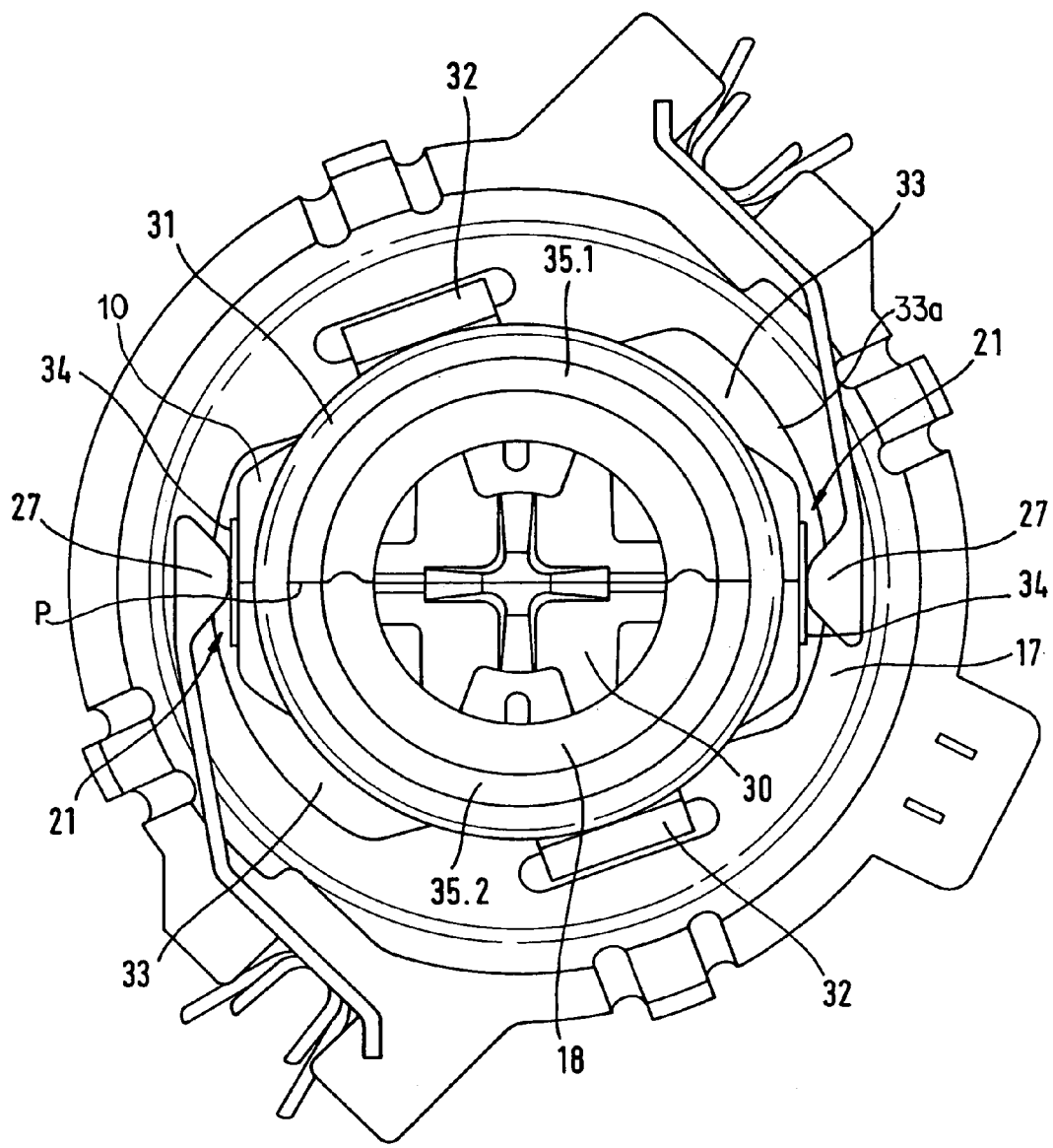
FIG. 2 shows a rear end of the holding ring fixedly mounted to the housing together with an inserted and contact-making receptacle tube after retracting a tool.

The reflector 13 is enclosed in a light housing 16 that is also equipped with a holding ring 17 made of electric-insulating material and disposed in a through-opening 28*a* of a truncated cone 28 that is fixed in the housing. The opening 28*a* is arranged coaxially behind the positioning sleeve 15. The large axial distance between the fixed holding ring 17 and the fixed positioning sleeve 15 is bridged by a tube 18. The tube 18 is designed at its front end as a receptacle 19 for receiving the base of a light bulb 20. At its rear end, the tube has an area of noncircular cross section forming an electrical connection area 21 having contacts 34 for the electric power supply of the receptacle 19 so that an electric feed cable 26 does not have to be directly connected to either the receptacle 19 or the spacing tube 18. The tube 18 is formed of two half-shells 35.1 and 35.2 (FIGS. 3, 4) which are joined along a longitudinal dividing plane P (FIG. 2).

As will be explained hereafter in detail, the tube 18, together with the bulb 20, can be inserted into the rear end of the housing (i.e., the left end in FIG. 1) along the axis 25. The tube 18 could be seated on the front end of a tool 29, such as a screwdriver, during this insertion procedure. The tube is passed axially through the holding ring 17 and then axially through the positioning sleeve 15 to locate the bulb 20 within the reflector 13. Then, the tool 29 is rotated about the axis 25 to rotate the tube 18 about the axis. As the tube 18 rotates, a projection 23 on the tube becomes coupled within a recess of the positioning sleeve, so that the bulb 20 is located at a precise position along the axis 25. Also as the tube 18 rotates, electrical contacts 34 disposed at the connecting area 21 of the tube (FIG. 2) are moved into electrical contact with feed contacts 27 which supply electric power to the bulb.

Said tube 18 flares radially out at the connecting area 21 to form triangular wing-shaped flared sections 10 lying diametrically opposed to one another and forming a trapezoid extending parallel to the dividing plane P of the double-shell tube 18, and whereby a respective connection contact 34 for contact in the holding ring 17 is freely accessible radially in the region of the tube's largest diameter.

The bulb 20 is preferably an incandescent bulb, particularly a halogen bulb, whose filament 22 has to maintain a specific position because of the radiation geometry in front of the vertex in the reflector 13, namely at the focus point of the light beam parabola. Since a specific distance of the filament 22 from the bulb base will be created during bulb manufacturing, the position of the filament 22 in the reflector 13 will be defined by the axial position of the light bulb receptacle 19 and thus of the tube 18 disposed in the positioning sleeve 15 behind the reflector 13. For this purpose, at least one rib-type radial projection 23 can be molded onto the outer surface of the tube 18 in the region of the receptacle 19, whereby said projection 23 engages in a bayonet catch of the sleeve 15. That is, the projection enters a groove 15*a* formed in a cylindrical wall of the sleeve parallel to the axis 25, and then is rotated about the axis 25 into a circumferential recess 24 of the sleeve. That is, the tube 18, with its forwardly equipped light bulb 20 is pushed at first axially from the rear into the positioning sleeve 15 until the projection abuts a front end of the groove 15*a*, and then the tube is turned. The receptacle 19 and the filament 22 of the light bulb are thereby disposed at a precise position along the axis 25 relative to the reflector 15, and the tube 18 is locked against axial movement.

In contrast, the connection area 21 of the tube 18, which is disposed in the holding ring 17, is axially displaceable relative to said holding ring 17 in response to thermal expansion/contraction of the tube, in order to prevent any axial twisting of the tube and avoid movement of the front portion of the tube and the bulb relative to the positioning sleeve 15. The electrical contacts 34 on the lateral flared sections 10 are dimensioned in the axial direction in such a manner that they remain in contact radially against the power supply feed contacts 27 that are disposed on the holding ring 17, even when the contacts and the tube undergo thermal displacement. Mechanically free cables 26 for the electric power supply lead to said feed contacts 27 so that no wiring harness is needed that would have to be moved along during manipulation of the tube 18.

For logical reasons it is functionally practical to provide a tube 18 of only one standard length to transverse the distance between the receptacle 19 and the connection area 21, which distance is equal to at least two diameters of the holding ring 17. The holding ring 17 in the housing 16 is then secured at a measured axial distance behind the positioning sleeve 15, preferably in the small front base of the sharp-angled hollow truncated cone 28 which is inserted into said housing 16 or made in one piece therewith. The hollow truncated cone 28 serves at the same time as a guide during insertion of the tube 18 through the hole 28*a* of the cone. The tube 18 is coaxially extended to the rear by means of a rod-like tool 29 that can be inserted with positive fit into a pyramid-shaped interior of the clamping element 30 disposed at the rear of the tube. The clamping element is radially elastic to some degree. The clamping element 30 can be realized in a simple manner in that two longitudinal shells 35.1, 35.2 forming the tube 18 are not rigidly joined together or heat-riveted at the rear end. Thus, the shells can be forced apart slightly by axial insertion of the tool 29 into the tapered clamping element 30 against the radial restoring force of a rubberized elastic ring 31 encompassing said clamping element 30. However, too much radial expansion of the clamping element 30 is prevented by diametrically opposed, axially projecting ribs 32 formed at the rear end of the holding ring 17 whereby the ring 31 lies between said projecting ribs 32.

The tool 29 engaging the clamping element 30 can be simply the blade of a screwdriver, which is a standard tool item on board of a motor vehicle. The tool can be again be rearwardly retracted from the clamping element 30 of the tube 18 and from the hollow truncated cone 28 of the housing 16 after the tube 18, together with its light bulb 20, has been axially inserted through the holding ring 17 into the positioning sleeve 15 and then rotated therein by a fraction of its circumference to become axially secured to the positioning sleeve. Removal of the tube occurs analogously in an inverse manner.

FIG. 3 and FIG. 4 show that the clamping element 30 disposed behind the flared section 10 and extending up to the connection area 21 of the cylindrical tube 18 can be simply formed by longitudinal, gapped, molded-on rib arches 40 surrounding its inner surface, possibly of variable radial dimensions. The radially biasing ring 31 is inserted into an annular groove between the ribs 41 encompassing the outer surface of the tube's rear area to yieldably press the tube shells together and at the same time acts as a vibration damping element against the ribs 32 attached fixedly to the housing.

FIG. 2 shows in a rear view the tube 18 rotated about its longitudinal axis 25 in its radial position in the holding ring 17 in the absence of the tool 29. Radial flared recessed sections 33 formed in an inner periphery of the holding ring are able to receive the noncircular flared sections 10 of the tube 18. A portion 33a of each recessed section 33 is circumferentially offset from the respective contact 27, as can be seen in FIG. 2, so the flared sections 10 of the tube 18 can enter the holding ring 17 along the respective portions 33a to avoid bending the contacts 27 as the tube 18 is inserted axially through the holding ring. When the tube 18 is subsequently rotated within the fixed sleeve 15 for axial locking of the tube, the flared sections 10 and their connection contacts 34 are driven beneath the feed contacts 27, whereby said connection contacts 34 make ramp-like contact with said feed contacts 27.

Thermal displacement of the connection area 21 in the holding ring 17 leads to an axial displacement of these contact pairs 27-34 relative to one another. However; the degree of contact is not impaired by such displacement but is even improved since displacement and friction-cleaning occurs between the contact pairs 27-34 during the thermal expansion/contraction occurring during the heating and cooling cycle. The axial displacement possibility of the contact pairs 27-24 relative to one another leads additionally, in a desired manner, to a compensation for the unavoidable manufacturing tolerances associated with the plastic injection molding process of the tube 18 and the mounting tolerance or clearance between the holding ring 17 and the positioning sleeve 15. The feed contacts pass through respective access openings 17a of the holding ring 17 to engage the contacts 34.

As already mentioned and as shown in FIG. 2, the elastic ring 31 in the region of the clamping element 30 holds together the rear ends of two half-shells 35.1, 35.2 to form the tube (i.e., 35.1+35.2=18). According to FIGS. 3 and 4, the half-shells 35 are designed having openings 36 and catches 37 diametrically opposed to one another to be able to connect the two half-shells 35.1+35.2 with an accurate fit and positive fit to one another. Holes 38 formed in the one half-shell 35.1 are penetrated by pins 39, which are congruently positioned and formed on the inside of the other half-shell 35.2, whereby the forward ends of said pins 39 can be subsequently hot-riveted to thermo-plastically rivet the joined half-shells permanently together to form the tube 18.

The half-shells 35.1, 35.2 have molded grooves 42 along their inner surface whereby said grooves 42 are open toward the dividing plane and into which grooves 42 there are inserted electric conductors 43a, 43b, preferably thin metallic strips projecting past the plane of the joint, before joining the half-shells together to form the tube 18. Said electric conductors 43a, 43b follow respectively the adjacent flared sections 10 of the tube 18 and their rear ends extend radially to the outside through a slot left open at both sides of the joint in the adjacent wall 44 of the respective half-shell to be accessible there as external, contactable connection contacts 34. The rear ends 34 of said conductors on the outside of the flared sections 10 are bent radially in the direction of the system axis 25 within the axis-parallel longitudinal spaces 45 which are open toward the outside so that the conductors can sufficiently move parallel to the axis without compression stress as a result of heat expansion. In addition, an undisturbed spring path is guaranteed as a result of the axial light bulb contact in the receptacle 19.

One of the two conductors 43a has its front end bent at an angle and is axially biased by a spring 47. That front end serves as a center contact 46 in the bayonet-type light bulb receptacle 19 at the front end of the half-shell 35.1. Turning of the radial contact pins at the base of the bulb 20 (FIG. 1) in the receptacle 19 leads to a slight axial displacement of the center contact 46 and thereby also of the conductor 43a and the groove 42 against the restoring force of the spring 47, which is inserted as a spiral spring behind the center contact 46 into a coaxial spring chamber 48. An axis-parallel, forward-pointing holding stud is molded to the rear end of said chamber 48 to make assembly easier and onto which stud the spring 47 can be pushed upon from the front. However, the other conductor 43b is disposed in a diametrically and opposite groove 42 and sits in the receptacle 19 as a side contact 49. The conductor 43b has a shape corresponding to the base of the bulb to be inserted; which means, angled and rib-shaped for a threaded base or L-shaped for a bayonet-type base (not shown in the drawing.)

According to a preferred development of the inventive solution it is proposed to design one of the two half-shells (namely 35.2 in FIG. 4) to have a rigid ring 50 encompassing the receptacle 19 in a concentric and closed manner whereby the inner surface of said half-shell 35.2 can be shaped to receive the light bulb receptacle. Thus, the highly heat-stressed front end of the receptacle 19 cannot be forced open when inserting the base of the light bulb between the adjoined half-shells 35.1, 35.2, which could lead then to an unreliable contact or loss of a bayonet slot for receiving the bulb. The other one of the two half-shells (35.1 in FIG. 3) is formed then correspondingly shorter axially because it projects now only up to the rear edge of the ring 50, which also extends around the second half of the tube 18. The shorter half-shell 35.1 is provided expediently with at least one axis-parallel stud 51 at its face, which engages the ring 50 at a respective recess with a positive fit to ensure a continuous connection here in the area of the light bulb receptacle in the completion of forming the tube 18.

In summary, between the light bulb receptacle 19 (mounted axially behind the light reflector 13), and the connection area 21 for the electric power supply of the receptacle 19, there extends the multi-shell tube 18 which passes through the fixed holding ring 17 which is spaced a considerable distance from receptacle 19. Within the tube 18 there are disposed axially movable conductors 43 leading from the contacts 46 inside the receptacle 19 to the connections 34 at the outer end of a noncircular flared connection point 21. The extreme heat development by the light bulb 20 remains without influence on either: (1) the accuracy of the axial position of its filament 22 in front of the reflector, or (2) the contact reliability at the connection area 21, which area is not axially fixed. Contact occurs there between the local feed contacts 27 in the holding ring 17 and the connection contacts 34 extending freely from the light bulb receptacle 19 in a longitudinal direction in the tube 18. Said contact occurs only by rotating the radially projecting connection area 21 to slide the contacts 34 beneath the radially resilient contact elements 27. The round portion of the tube 18 located behind the connection area 21 can be slightly forced radially open against an elastic closing force to allow non-positive engagement here with the rod-like tool 29 to cause a contacting coaxial rotation with positive fit. One of the shells 35.2 in the forward receptacle area is preferably designed having a rigid ring 50 encompassing the tube 18 coaxially to prevent radial widening of the receptacle 19 during radial stress through the inserted light bulb base or while the bulb base is being inserted.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A light assembly comprising:
 a housing defining front and rear ends interconnected by a longitudinal axis;

a hollow holding ring and a reflector fixed within the housing for reflecting light forwardly along the axis and arranged along the axis, wherein the reflector is spaced axially forwardly of the holding ring;

a hollow positioning sleeve disposed at a rear end of the reflector and arranged along the axis at a distance forwardly of the holding ring; and a tube extending along the axis and including front and rear portions, the front portion mounted in the positioning sleeve and including a bulb receptacle for positioning a bulb within the reflector, the rear portion including an electrical connection portion disposed in the holding ring.

2. The light assembly according to claim 1 wherein the front portion of the tube is locked against axial movement relative to the positioning sleeve; the electrical connection portion being displaceable axially relative to the holding ring to accommodate thermal expansion and contraction of the tube.

3. The light assembly according to claim 1 wherein an axial distance between the lamp receptacle and the electrical connection portion is equal to at least two diameters of the holding ring.

4. The light assembly according to claim 1 further including a first electrical contact disposed in the tube at the receptacle, and a second electrical contact disposed on the tube at the rear portion and defining the electrical contact disposed in the holding ring.

5. The light fixture according to claim 4 wherein the second contact is accessible through a radial access opening formed through a wall of the holding ring, and a conductor extends through the tube and interconnects the first and second contacts.

6. The light assembly according to claim 5 wherein the portion of the tube on which the second contact is disposed is of enlarged cross-section compared to a portion of the tube extending between the holding ring and the positioning sleeve.

7. The light assembly according to claim 6 wherein the conductor extends substantially parallel to the axis.

8. The light assembly according to claim 5 further including a power supply contact extending through the access opening, the second contact arranged to be brought into engagement with the power supply contact in response to rotation of the tube about the axis.

9. The light assembly according to claim 1 further including a hollow truncated cone fixed to the housing and arranged coaxially along the axis, wherein a smaller cross-sectional end of the truncated cone faces forwardly toward the reflector; wherein the holding ring is mounted to the smaller cross-sectional end of the truncated cone.

10. The light assembly according to claim 8 wherein the tube is arranged to be locked against axial movement relative to the positioning sleeve in response to the rotation of the tube about the axis.

11. The light assembly according to claim 10 wherein the positioning sleeve includes an axial slot open at a rear end thereof, and a circumferential recess communicating with the slot; the tube including a projection movable axially into the slot and then circumferentially within the recess when the tube is rotated about the axis.

12. The light assembly according to claim 10 wherein the connection portion of the tube is axially displaceable relative to the holding ring, to accommodate thermal expansion/contraction of the tube.

13. A tube adapted to be inserted into a housing of a light assembly, the tube having a central longitudinal axis and having front and rear ends intersected by the axis, the tube comprising:

a pair of half-shells defining a longitudinal dividing plane;

a front axial portion of the tube forming a lamp receptacle adapted to receive a lamp for directing light in a generally axially forward direction, and a rear axial portion of the tube forming an electrical connection portion;

the rear portion of the tube defining a clamp open in a rearward direction, and encompassed by an elastic ring yieldably holding the half-shells together at the clamp;

a first electrical contact disposed in the tube at the receptacle;

a second electrical contact disposed on the electrical connection portion of the tube; and a conductor disposed in the tube and interconnecting the first and second electrical contacts.

14. The tube according to claim 13 wherein the front end portion of the tube further includes a radially outwardly extending projection.

15. The tube according to claim 13 wherein the electrical connection portion of the tube is radially enlarged and non-circular.

16. A light assembly comprising:

a housing defining front and rear ends interconnected by a longitudinal axis;

a reflector fixed within the housing for reflecting light forwardly along the axis and arranged along the axis;

a hollow positioning sleeve disposed at a rear end of the reflector and arranged along the axis; and a tube extending along the axis and including front and rear portions, the front portion mounted in the positioning sleeve and including a bulb receptacle for positioning a bulb within the reflector, the rear portion including an electrical connection portion.

17. The light assembly according to claim 16 further including a hollow holding ring fixed within the housing and oriented coaxially relative to the longitudinal axis; the positioning sleeve spaced axially forwardly of the holding ring; the electrical connection portion disposed in the holding ring.

18. The light assembly according to claim 16 comprising a vehicle signal light.

19. The light assembly according to claim 16 wherein the rear portion of the tube includes a rearwardly open clamping element adapted to receive a tool.

20. The light assembly according to claim 19 wherein the tube comprises a plurality of shells defining a longitudinal dividing plane.

21. The light assembly according to claim 20 further including an elastic element encompassing the clamping element of the multi-shell tube for yieldably opposing radial separation of the shells.

22. The right assembly according to claim 16 wherein the tube comprises a plurality of shells defining a longitudinal dividing plane, and a rigid cylindrical ring encompassing the receptacle to prevent separation of the shells upon insertion of a bulb.

23. The light assembly according to claim 22 wherein the rigid cylindrical ring is formed on one of the shells; another of the shells extending axially to a rear end of the rigid cylindrical ring.

\* \* \* \* \*